United States Patent
Kobayashi

(10) Patent No.: US 8,091,600 B2
(45) Date of Patent: Jan. 10, 2012

(54) HEAVY DUTY PNEUMATIC TIRE WITH WIDE-WIDTH BELT LAYER CONVEX PORTION

(75) Inventor: Kazuomi Kobayashi, Higashimurayama (JP)

(73) Assignee: Bridgestone Corporation, Tokyo (JP)

(*) Notice: Subject to any disclaimer, the term of this patent is extended or adjusted under 35 U.S.C. 154(b) by 1065 days.

(21) Appl. No.: 11/910,082

(22) PCT Filed: Feb. 3, 2006

(86) PCT No.: PCT/JP2006/301875
§ 371 (c)(1),
(2), (4) Date: Oct. 26, 2007

(87) PCT Pub. No.: WO2006/103831
PCT Pub. Date: Oct. 5, 2006

(65) Prior Publication Data
US 2008/0271829 A1    Nov. 6, 2008

(30) Foreign Application Priority Data
Mar. 29, 2005    (JP) .................................. 2005-094747

(51) Int. Cl.
*B60C 9/18* (2006.01)
*B60C 9/28* (2006.01)
(52) U.S. Cl. .......... 152/532; 152/534; 152/535; 152/538
(58) Field of Classification Search .................. 152/532, 152/534, 535, 538
See application file for complete search history.

(56) References Cited

U.S. PATENT DOCUMENTS

| | | | | |
|---|---|---|---|---|
| 6,145,560 A | * | 11/2000 | Yamada et al. | 152/532 |
| 7,441,576 B2 | * | 10/2008 | Yamanaka | 152/532 X |
| 2005/0000617 A1 | * | 1/2005 | Tsuruta | 152/538 X |

FOREIGN PATENT DOCUMENTS

| | | | | |
|---|---|---|---|---|
| JP | 7-25203 | A | | 1/1995 |
| JP | 07061208 | A | * | 3/1995 |
| JP | 8-108709 | A | | 4/1996 |
| JP | 9-323506 | A | | 12/1997 |
| JP | 11-170809 | A | | 6/1999 |

(Continued)

OTHER PUBLICATIONS

Webster's New Collegiate Dictionary, G. & C. Merriam Co., Springfield, MA, 1977, p. 249.*

(Continued)

*Primary Examiner* — Adrienne C Johnstone
(74) *Attorney, Agent, or Firm* — Sughrue Mion, PLLC

(57) ABSTRACT

A heavy duty pneumatic tire, which allows the inside narrow-width belt layers to have a wide width as desired, and which suppresses the amount of strain generated at side edge portions of the belt layer to be sufficiently small thereby effectively preventing the separation of the belt layer, therefore the belt, in which two inside narrow-width belt layers 1B, 2B and two outside wide-width belt layers 3B, 4B, which have a larger width than the narrow-width belt layers, are sequentially disposed in the outer periphery side of the crown area of the radial carcass 5, wherein a portion of the wide-width belt layer 3B adjacent to the outer periphery side of the two narrow-width belt layers 1B, 2B, corresponding to side-edge vicinity of the narrow-width belt layer 2B of the outer periphery side is formed to be convex in radially outward direction.

5 Claims, 12 Drawing Sheets

FOREIGN PATENT DOCUMENTS

| | | | |
|---|---|---|---|
| JP | 11-278014 A | | 10/1999 |
| JP | 11-348509 A | | 12/1999 |
| JP | 2001-301418 A | | 10/2001 |
| JP | 2001-301420 A | | 10/2001 |
| JP | 2001294016 A | * | 10/2001 |
| JP | 2002-362109 A | | 12/2002 |
| JP | 2004098850 A | * | 4/2004 |
| WO | WO-2004/103736 A1 | * | 12/2004 |

OTHER PUBLICATIONS

International Search Report dated May 2, 2006.

JP 2001-301418 Abstract only, Oct. 21, 2001.

* cited by examiner

FIG. 8
(a)
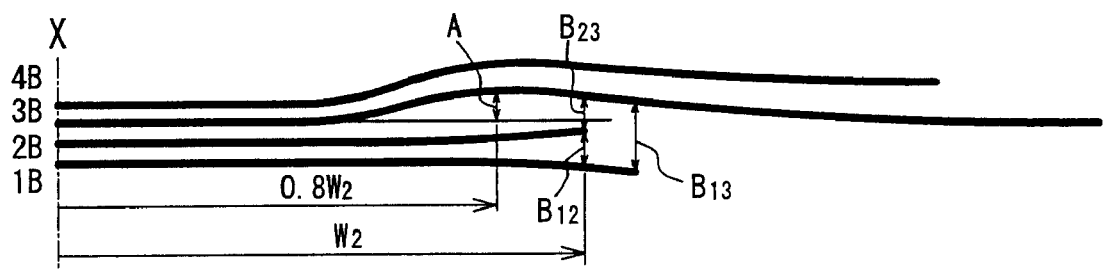
(b)
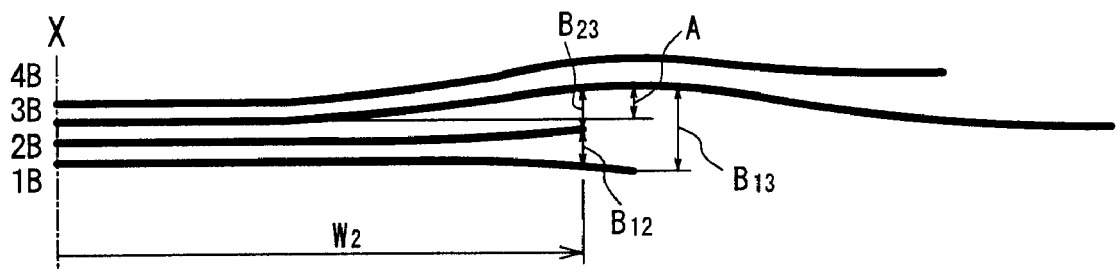
(c)
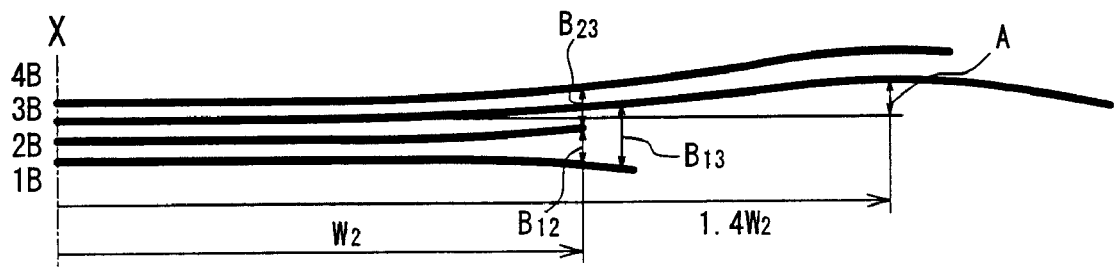

|  | CONVENTIONAL TIRE | EMBODIMENT TIRE 1 | EMBODIMENT TIRE 2 | EMBODIMENT TIRE 3 | EMBODIMENT TIRE 4 | EMBODIMENT TIRE 5 |
|---|---|---|---|---|---|---|
| CONVEX PART FORMING POSITION | NONE | $0.8W_2$ | $0.9W_2$ | $1.0W_2$ | $1.2W_2$ | $1.4W_2$ |
| A (mm) | 0.0 | 5.0 | 5.0 | 5.0 | 5.0 | 5.0 |
| $B_{13}$ (mm) | 7.5 | 13.5 | 14.5 | 17.5 | 16.5 | 14.5 |
| $B_{23}$ (mm) | 2.5 | 3.0 | 3.5 | 5.0 | 4.5 | 3.5 |
| $B_{12}$ (mm) | 2.5 | 3.0 | 3.5 | 5.0 | 4.5 | 3.5 |
| C23 (mm) | 50 | 49 | 40 | 28 | 26 | 51 |
| C12 (mm) | 56 | 55 | 44 | 30 | 29 | 55 |

FIG. 10
(a)
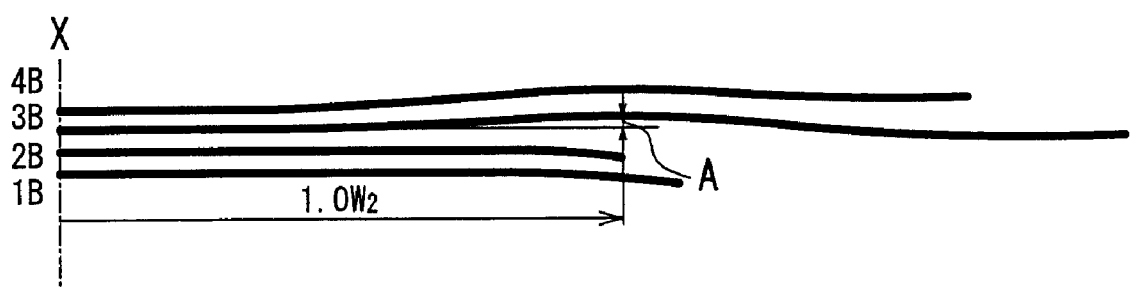
(b)
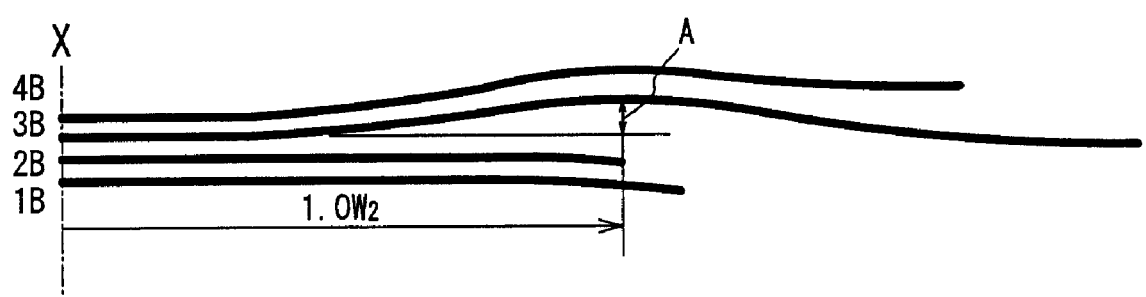

| | CONVENTIONAL TIRE | EMBODIMENT TIRE 6 | EMBODIMENT TIRE 7 | EMBODIMENT TIRE 8 | EMBODIMENT TIRE 9 |
|---|---|---|---|---|---|
| CONVEX PART FORMING POSITION | NONE | $1.0W_2$ | $1.0W_2$ | $1.0W_2$ | $1.0W_2$ |
| A (mm) | 0.0 | 2.5 | 5.0 | 10.0 | 15.0 |
| $B_{13}$ (mm) | 7.5 | 10.0 | 12.5 | 17.5 | 22.5 |
| $B_{23}$ (mm) | 2.5 | 5.0 | 7.5 | 12.5 | 17.5 |
| $B_{12}$ (mm) | 2.5 | 2.5 | 2.5 | 2.5 | 2.5 |
| C23 (mm) | 50 | 33 | 24 | 13 | 10 |
| C12 (mm) | 56 | 50 | 44 | 37 | 30 |
| HEAT GENERATION PROPERTY EVALUATION | 0.0 | 0.0 | 0.5 | 2.0 | 6.0 |

| | CONVENTIONAL TIRE | EMBODIMENT TIRE 10 | EMBODIMENT TIRE 11 | EMBODIMENT TIRE 12 | EMBODIMENT TIRE 13 |
|---|---|---|---|---|---|
| CONVEX PART FORMING POSITION | NONE | $1.0W_2$ | $1.0W_2$ | $1.0W_2$ | $1.0W_2$ |
| A (mm) | 0.0 | 5.0 | 5.0 | 5.0 | 5.0 |
| $B_{13}$ (mm) | 7.5 | 12.5 | 12.5 | 12.5 | 12.5 |
| $B_{23}$ (mm) | 2.5 | 7.5 | 5.0 | 3.5 | 2.7 |
| $B_{12}$ (mm) | 2.5 | 2.5 | 5.0 | 6.5 | 7.3 |
| $B_{12}/B_{23}$ | 1.0 | 0.3 | 1.0 | 1.9 | 2.7 |
| $C_{23}$ (mm) | 50 | 24 | 28 | 34 | 48 |
| $C_{12}$ (mm) | 56 | 44 | 30 | 22 | 20 |

CRACK GROWTH LENGTH VERSUS RATIO OF INTERLAYER RUBBER THICKNESSES

HEAVY DUTY PNEUMATIC TIRE WITH WIDE-WIDTH BELT LAYER CONVEX PORTION

FIELD OF THE INVENTION

The present invention relates to a heavy duty pneumatic radial tire suitable truck and bus tires, construction vehicle tires and the like which are inflated with high air pressure and used under high load conditions, and it specifically proposes a technique to effectively suppress the occurrence of separation at a side edge position of a belt made up of not less than three belt layers, thereby improving the durability of the belt.

DESCRIPTION OF THE RELATED ART

As an example of such type of conventional tires, there is a tire, as disclosed in Japanese Patent Laid-Open No. 2002-362109, which is provided at the outer-peripheral side of a crown area of a radial carcass with a main belt which is formed by sequentially disposing, for example, two inside narrow-width belt layers and two outside wide-width belt layers which have a wider width than the narrow-width belt layers respectively along the crown area of the radial carcass in the widthwise section of tire. In the aforementioned tire, the beltcord of the narrow-width belt layer is configured to extend in a direction to intersect with a tire equatorial plane with a relatively small angle so that the narrow-width belt layers bear the circumferential tension of the tire to suppress the diameter growth of tire, thereby preventing changes in the crown shape while the tire is rolling under load, and also the belt layer is configured to have a relatively small width, so that the strain generated at a side edge of the belt layer is reduced.

On the other hand, the wide-width belt layers are configured to have a larger intersection angle of the beltcord with respect to the tire equatorial plane than that of the beltcord of the narrow-width belt layer, and to have a larger belt width larger than that of the narrow-width belt layer so that the in-plane rigidity of the belt is increased thereby securing enhanced vehicle dynamic performances such as the steering response of tire during a cornering operation of the vehicle and the stability during straight driving of the vehicle.

In the above described case, it is considered to be necessary that respective beltcords of the two inside belt layers, i.e. narrow-width belt layers are configured to extend in opposite directions to each other with respect to the tire equatorial plane so as to intersect between the layers so that they bear a sufficient belt tension, and also respective beltcords of the two outside belt layers, i.e. wide-width belt layers are configured to intersect in a similar fashion between the layers so that the belt exhibits a high in-plane bending rigidity.

Further, it is known that when the respective beltcords of the narrow-width belt layer at the second layer position from inside in the radial direction and the wide-width belt layer at the third layer position are configured to extend in opposite directions to each other with respect to the tire equatorial plane to intersect with each other between the layers, since the extension directions of respective beltcords of the innermost narrow-width belt layer, which has a larger width than the narrow-width belt layer at the second layer position, and the wide-width belt layer at the third layer position become the same, strain between the layers for a circumferential tension will be reduced thereby preventing the concentration of strain at a side edge of the innermost narrow-width belt layer.

Therefore, it is considered that, in the main belt, configuring respective beltcords of all the belt layers to extend intersecting with each other between layers is preferable in suppressing the diameter growth of the tire and increasing the in-plane and out-of-plane rigidities of the belt.

However, in such conventional tires as described above, when the intersection angle of the beltcord, especially of the two narrow-width belt layers of the inside is decreased with respect to the tire equatorial plane to enhance the suppression effect of the diameter growth, crack at a side edge of the belt layer is more likely to occur. In order to satisfy both of the effects of suppression of diameter growth and suppression of crack generation, the width of the narrow-width belt layer has to be made smaller. Therefore, a relative decline of the diameter growth restriction function becomes inevitable, and it becomes difficult to sufficiently restrict the generation of cracks at side edges of the narrow-width belt layers, as well as to restrict the diameter growth of tire as desired and to increase the in-plane and out-of-lane rigidities of the belt as desired.

For this reason, it is proposed to cover the side edge portion of the belt layer with coating rubber, or to select the elastic modulus of the interlayer rubber in a side-edge vicinity of the belt layer, thereby suppressing the generation of cracks. This has been, however, unable to realize a satisfactory prevention of cracks.

DISCLOSURE OF THE INVENTION

Problems to be Solved by the Invention

When a tire is operated under load, forces will be input to the main belt, which exhibits an annular shape, from various directions such as the circumferential direction, radial direction and belt width direction and, in response to such inputs, interlayer sheer strains and other strains take place which are caused by for example a pantograph-like displacement of the intersection cords at a side edge portion of each belt layer. Such strains tend to increase as the intersection angle of the beltcord with respect to the tire equatorial plane decreases and the belt layer width increases as in the case of the above described inside narrow-width belt layers, resulting in a problem that at sites where strain is large, a crack will take place at a side edge of the belt layer in an early stage and the crack is likely to progress between belt layers.

In the case of the belt layers on the outside belt layers of the above described conventional tire, a larger belt layer width is effective in securing a high rigidity of the main belt, and a larger intersection angle of the beltcord with respect to the tire equatorial plane is effective in reducing strain, so that it becomes possible even for conventional tires to satisfy both performances satisfactorily.

On the other hand, the inside narrow-width belt layers of the conventional tires, which have a smaller intersection angle of the beltcord with respect to the tire equatorial plane, contains a contradiction in that while it is inevitable to secure a certain level of belt layer width to suppress the diameter growth, it is necessary to decrease the width of the narrow-width belt layer to reduce the strain at a side edge of the belt layer. Therefore, there has been a problem in that if the width of the narrow-width belt layer is reduced with the reduction of strain being the primary purpose, the diameter growth associated with rolling of tire under load undeniably takes place thereby forcibly increasing heat generation and wear loss of the tire, and separation which caused by an early progress of cut flaws generated on the tread surface and progresses along the belt layer situated at the outermost layer position becomes more likely to occur.

The present invention has been made to solve the above described problems of the related art, and its purpose is to provide a heavy duty pneumatic tire in which the inside narrow-width belt layer may have as a large width as desired thereby satisfactorily restricting the diameter growth of tire and, in addition, the amount of strain generated at a side edge portion of the narrow-width belt layer can be suppressed to be a sufficiently small, thereby effectively preventing the separation of the belt layers, and thus of the belt.

Means for Solving the Problem

The present invention allows the belt layer, in which the beltcord has a small intersection angle with respect to the tire equatorial plane, to have a desired width for the belt layer while suppressing the increase of shear strain generated at a side edge portion of a belt layer by focusing on the configuration of the side portion of the belt layer. The heavy duty pneumatic tire according to the present invention is configured such that two inside narrow-width belt layers and one or more outside wide-width belt layers, which have a larger width than the narrow-width belt layers, are sequentially disposed in the outer periphery side of a crown area of a radial carcass; and that under a state where the tire is assembled to a applied rim and inflated with a specified internal pressure, the inner narrow-width belt layer is adapted to have a larger width compared with the outer narrow-width belt layer, each beltcord of the two narrow-width belt layers is adapted to have a smaller intersection angle with respect to the tire equatorial plane than that of the beltcord of the wide-width belt layers, the beltcords of those narrow-width belt layers are adapted to extend in a direction so as to intersect with each other between the layers, preferably in opposite directions to each other with respect to the tire equatorial plane, and also for example under the state as described above, a portion of the wide-width belt layer, which is situated adjacent to the outer periphery side of the two narrow-width belt layers, corresponding to a side-edge vicinity of the outer narrow-width belt layer, is formed to be convex in radially outward direction.

Preferably, a maximum projection height (A) of a convex part, which is formed to be convex in radially outward direction, of the wide-width belt layer, that is, a maximum projection height (A) of the inner peripheral face of the convex-part, measured in the tire width direction from the tire equatorial plane, that is, measured in the tire radial direction from the straight line in contact with the subject position of the inner peripheral surface of the wide-width belt layer and extending parallel with the central axis line of the tire with reference to the inner peripheral face of the wide-width belt layer at a position of the outer narrow-width belt layer at a distance of 0.1 times the width ($W_2$) is within the following range:

$$0.5 \times d_3 < A < 2 \times d_3$$

where $d_3$ is a diameter of beltcord of the above described wide-width belt layer.

The term "a side-edge vicinity of a narrow-width belt layer of the outer periphery side" as used herein refers to a portion within a range of 80% to 140% of the width ($W_2$) of the narrow-width belt layer with the tire equatorial plane being at its center, and, in this context, the maximum projection portion of the convex part is supposed to be positioned within the above described range.

Moreover, the above-described term "an applied rim" refers to a rim specified in the standard shown below depending on the tire size, and the term "a specified internal pressure" refers to the air pressure specified for the maximum load capacity in the standard shown below, where the maximum load capacity is the maximum mass permitted to be applied to the tire.

In this respect, herein air may be replaced with an inert gas such as nitrogen gas and the like.

The above-described standard is one which is determined based on an industrial standard which is effective in the region where the tire is produced or used. That is, for example, "YEAR BOOK of THE TIRE AND RIM ASSOCIATION INC." in the United States, "STANDARDS MANUAL of The European Tyre and Rim Technical Organisation" in Europe, and the "JATMA YEAR BOOK" of Japan Automobile Tire Association in Japan.

Preferably, for example, under a state where the tire is assembled to a applied rim and inflated with a specific internal pressure, the width of respective narrow-width belt layer is within a range of 0.25 to 0.5 times of the tread width (TW), and the angle of the beltcord made of, for example, steel with respect to the tire equatorial plane is within a range of 3 to 10°. Also preferably, under a similar state, the width of respective wide-width belt layer is within a range of 0.6 to 0.8 times of the tread width (TW), and the intersection angle of the beltcord made of, for example, steel with respect to the tire equatorial plane is within a range of 15 to 35°.

In what has been described, the difference between the average width of the wide-width belt layers and the average width of the narrow-width belt layers is preferably within a range of 0.2 to 0.4 times of the tread width (TW).

Further, in the tire according to the present invention, in addition to what has been described above, for example, under the above-described state, a rubber thickness ($B_{12}$), which includes the coating rubber, measured at a side edge position of the outer belt layer of the two narrow-width belt layers from the beltcord thereof to the beltcord of the inner belt layer is adapted to be larger than a similar rubber thickness of other portions between those layers, and the rubber thickness ($B_{12}$) with reference to a similar rubber width ($B_{23}$) from the beltcord at the side edge position of the outer narrow-width belt layer to the beltcord of the wide-width belt layer adjacent to the outer periphery side of the outer narrow-width belt layer is preferably within the following range:

$$0.7 \times B_{23} < B_{12} < 1.8 \times B_{23}.$$

EFFECT OF THE INVENTION

A running endurance test using a drum is conducted on a conventional tire having a main belt as shown in FIG. 13 as a half-width sectional view in the tire width direction, result of which reveals that from a side edge position of the belt layer 53 situated at the outer periphery side of the two inside narrow-width belt layers 52, 53 disposed on the outer-periphery side of the crown area of the radial carcass 51, in addition to a crack $C_1$ extending toward the narrow-width belt layer 52 situated at the inner periphery side thereof, a crack $C_2$ is generated which extends toward the outside wide-width belt layer 54 situated adjacent to the outer periphery side thereof, and progresses between the belt layer 53 and the belt layer 54, and from the side edge position of the belt layer 52 situated at the innermost layer, a crack $C_3$ is generated which extends toward the narrow-width belt layer 53 situated at the outer peripheral side and progresses between the belt layer 52 and the belt layer 53.

Moreover, reference numeral 55 in the figure denotes the outer wide-width belt layer which is situated at the outermost layer.

Then, generation of interlayer shear strain which would cause such cracks $C_1$, $C_2$, $C_3$ as described above has been analyzed by means of a strain analysis by a finite element analysis method, the result of which reveals that the interlayer shear strain includes an interlayer shear strain in the circumferential direction which is generated over the entire width of the belt by a bending deformation of the belt in the circumferential section of the tire caused by the fact that the ground contact portion of the tread undergoes an indentation deformation right beneath the load by a rolling of the tire under load, and in addition to that, an interlayer shear strain caused by a circumferential tension generated at side portion of the belt when a load is applied to the tire and a lateral input force acts on the tread surface, and the like.

Therefore, it is speculated that such cracks $C_1$, $C_2$, $C_3$ as described above originated from each side edge of the belt layers 52, 53 take place due to the overlapping of such two kinds of interlayer shear strains, and the mode of such overlapping of the interlayer shear strains can be represented by a graph exemplarily shown in FIG. 14.

According to FIG. 14, the strain between respective narrow-width belt layers 52, 53 becomes larger at its side edge portion by the overlapping of the shear strain by bending and the shear strain by tension, while the shear strain between belt layers 53, 54 becomes large at side edge portion of both the narrow-width belt layers 52, 53, but gradually decreases from the side edge of the narrow-width belt layer 53 toward outside in the belt width direction.

Based on what has been described so far, it will be effective in suppressing the generation of cracks $C_1$, $C_2$, $C_3$ to reduce at least one of the shear strain due to bending or the shear strain due to tension.

Here, it is effective in reducing the interlayer shear strain caused by bending deformation to increase the difference in circumferential elongation right beneath load between adjacent belt layers.

That is, in a case where each of not less than three belt layers is laminated with beltcords being intersected to each other and each exhibits rigidity against the bending deformation in the circumferential section, when the belt is deformed by bending in the same section by for example a tire tread-in, a shear strain caused by the difference in the elongation between the belt layer of the inner-peripheral side and the belt layer of the outer-peripheral side will be generated. Such shear strain, however, can be reduced by making both the outer side and inner side belt layers to be more likely to elongate.

Moreover, in order to reduce the interlayer shear strain caused by such circumferential bending, it is important to keep a large distance between the inside belt layers and the outside belt layers. Therefore, in this invention, the wide-width belt layer, which is the third belt layer and adjacent to the outer-periphery side of the outer narrow-width belt layer, is formed to be a convex in the radially outward direction at a portion corresponding to the side-edge vicinity of the outer narrow-width belt layer, which is the second layer from the innermost layer, of the two narrow-width belt layers.

On the other hand, in the belt structure of the tire according to the present invention, the two inside narrow-width belt layers, which have a small beltcord intersection angle with respect to the tire equatorial plane, are less prone to elongate in the circumferential direction, while more than one outside wide-width belt layers, which are situated on the outer periphery side of the above described belt layers and have a relatively large beltcord intersection angle with respect to the tire equatorial plane, are more prone to contract. Therefore, when, due to load applied to the tire, the belt is subjected to a bending deformation in the circumferential section right beneath the load, and thereby, at the side portion of the belt where the interlayer shear strain is significant, the outside wide-width belt layer is situated on the compression side of the neutral axis of bending, and the two inside narrow-width belt layers are situated on the tension side of the neutral axis, it becomes possible to subject the side-edge portion of the narrow-width belt layer at the second layer position to a circumferential tension and subject the outside wide-width belt layer to a compressive force while accepting the above described properties of respective belt layers, thereby increasing the difference of circumferential elongation or contraction between the belt layers to effectively reducing shear strain generated between them.

Then, the wide-width belt layer which is the third belt layer is provided as described above with a convex part which is convex in radially outward direction, and the convex part is positively positioned on the compression side from the neutral axis of bending thereby making the difference in expansion and contraction to be sufficiently large between the narrow-width belt layer at the second layer position and the wide-width belt layer at the third layer position.

FIG. 1 is a graph to show the above described situation, and this reveals that the interlayer shear strain between the narrow-width belt layer at the second layer position and the wide-width belt layer at the third layer position can be effectively reduced especially at the side portion of the belt, compared with the case shown in FIG. 14.

Further, in this case, the interlayer shear strain between the innermost narrow-width belt layer and the narrow-width belt layer at the second layer position can also be effectively reduced compared with case shown in FIG. 14.

That is, since the bending deformation in the circumferential section takes place in one body from the innermost belt layer to the third belt layer, and the deformation at this moment becomes nearly constant, the strain between the innermost belt layer and the second belt layer is mitigated as the natural consequence of the fact that the strain between the second belt layer and the third belt layer is mitigated.

On the other hand, in order to achieve such reduction of interlayer shear strain caused by bending deformation, it is necessary to place the convex part of the wide-width belt layer at the third layer position, among others the maximum projection portion thereof, in a portion corresponding to a side-edge vicinity portion of the outer narrow-width belt layer, that is, in the region of the outer narrow-width belt layer within 80% to 140% of width (W2) measured in the tire width direction centered around the tire equatorial plane.

According to this, it is possible to sufficiently increase the efficiency of providing the convex part by placing the convex part of the wide-width belt layer on the outer-periphery side of respective side edges of the innermost narrow-width belt layer and the narrow-width belt layer at the second layer position.

That is, when placing the convex part in the region of less than 80%, even if the interlayer shear strain from the innermost belt layer to the third belt layer can be reduced, it will become difficult to reduce the strain at side edge positions of the innermost belt layer and the second belt layer.

On the other hand, when placing the convex part in the region exceeding 140%, the position of the convex part is too far away from the side edge positions of the innermost and the second belt layers having strain to be reduced, making it difficult to attain a strain reducing effect.

Further, in this case, the maximum projection height (A) of the inner peripheral surface of the convex part of the wide-width belt layer, which is measured in the tire radial direction from the straight line which is tangent to the inner peripheral surface of the wide-width belt layer at a position a distance of 0.1 times of the width (W2) of the outer-peripheral side narrow-width belt layer away from the tire equatorial plane, and extending parallel with the central axis line of the tire, is adapted to be within the following range:

$$0.5 \times d_3 < A < 2 \times d_3$$

where $d_3$ is a diameter of beltcord of the above described wide-width belt layer.

In other words, when the maximum projection height (A) is not more than $0.5d_3$ for the beltcord diameter ($d_3$) which can be 1.0 to 7.0 mm, the interlayer shear strain caused by bending deformation cannot be reduced as desired. On the other hand, when it is not less than $2d_3$, the interlayer rubber thickness in the middle portion of the width of the belt becomes too thick, and it becomes difficult to impart a desired crown radius to the tread surface, and besides there is an inconvenience in that the thickness of the entire tread becomes too large resulting in an excessive heat generation in the tread part.

Further, FIG. 1 shows a case in which in addition to the above described reduction of the interlayer shear strain caused by bending deformation, the interlayer shear strain at a side portion of the belt caused by circumferential tension is effectively reduced compared with that shown in FIG. 14. The latter reduction of the shear strain can be realized by placing the side edge portion of the narrow-width belt layer at the second layer position toward radially outward direction compared with other portions for the side edge portion of the innermost narrow-width belt layer and thereby increasing the rubber thickness between the two.

That is, when under the action of a circumferential tension, the respective beltcords of the two belt layers undergo a relative displacement in the opposite direction of tire circumference, it is possible to reduce the interlayer shear strain by the action of thick rubber layer between them.

In this case, based on the premise that the width of the narrow-width belt layer at the second layer position is smaller than that of the innermost narrow-width belt layer, the rubber thickness ($B_{12}$) including the coating rubber thickness from the respective beltcords at the side edge position of the narrow-width belt layer at the second layer position to the beltcord of the innermost narrow-width belt layer with respect to the rubber thickness ($B_{23}$) from the beltcord of the second belt layer to the beltcord of the wide-width belt layer at the third layer position is preferably adapted to be within the following range:

$$0.7 \times B_{23} < B_{12} < 1.8 \times B_{23}.$$

That is, adapting the rubber thickness ($B_{12}$) to be not more than $0.7B_{23}$ will make it difficult to suppress the strain between the innermost belt layer and the second belt layer; on the other hand, adapting it to be not less than $1.8B_{23}$ will make the interval between the innermost belt layer and the second belt layer too large, as the result of which the interval between the second belt layer and the third belt layer becomes too small thereby causing a risk that the strain between the layers becomes too large.

In the heavy duty pneumatic tire as described so far, when the respective widths of the innermost and second narrow-width belt layers are adapted to be within a range of 0.25 to 0.5 times of the tread width (TW), it is possible to make the narrow-width belt layers sufficiently exhibit the diameter growth restriction function, and further to effectively prevent the generation of a crack from side edges of the belt layers.

In other words, if it is less than 0.25 times, a similar problem as described above will arise on the heat generation amount, wear loss, and the like caused by the diameter growth of the tire; and if it exceeds 0.5 times, a problem will arise in, in addition to the increase of shear stress at side edges of belt layers as described above, the degradation of vibration and riding comfort.

Further in this case, the intersection angle of the beltcord of the narrow-width belt layer with respect to the tire equatorial plane is preferably adapted to be 3 to 10° so that the belt layer exhibits a high circumferential tension resistance thereby improving the durability of the belt.

That is, if the intersection angle is less than 3°, molding raw tire is difficult and there is risk that the strain at the side edge of the belt layer becomes too large; on the other hand, if it exceeds 10°, the tension resistance of the narrow-width belt layer becomes insufficient and there is risk that the restriction force of the diameter growth of tire becomes too small.

Furthermore, more than one wide-width belt layer preferably has a width of 0.6 to 0.8 times of the tread width (TW) so that the in-plane bending rigidity is increased thereby increasing the cornering force, and securing excellent steering stability and wear resistance.

If the width of wide-width belt layer is less than 0.6 times, the diameter growth restriction function will be undeniably deteriorated; and if it exceeds 0.8 times, separation failures at side edges of belt layers are more likely to occur.

Moreover, in this case, it is preferable to make the intersection angle of the beltcord of the wide-width belt layer with respect to the tire equatorial plane to be 15 to 35° to impart a large in-plane bending rigidity to the belt.

Furthermore, it is preferable to make the difference between the average width of wide-width belt layers and the average width of narrow-width belt layers to be 0.2 to 0.4 times of the tread width (TW) to balance the functions of the inside belt layer and the outside belt layer.

BRIEF DESCRIPTION OF THE DRAWINGS

FIG. 8 illustrates the belt structure of an embodiment tire used in Embodiment 1;

FIG. 10 illustrates the belt structure of an embodiment tire used in Embodiment 2;

DETAILED DESCRIPTION OF THE PREFERRED EMBODIMENTS

Figure 2:
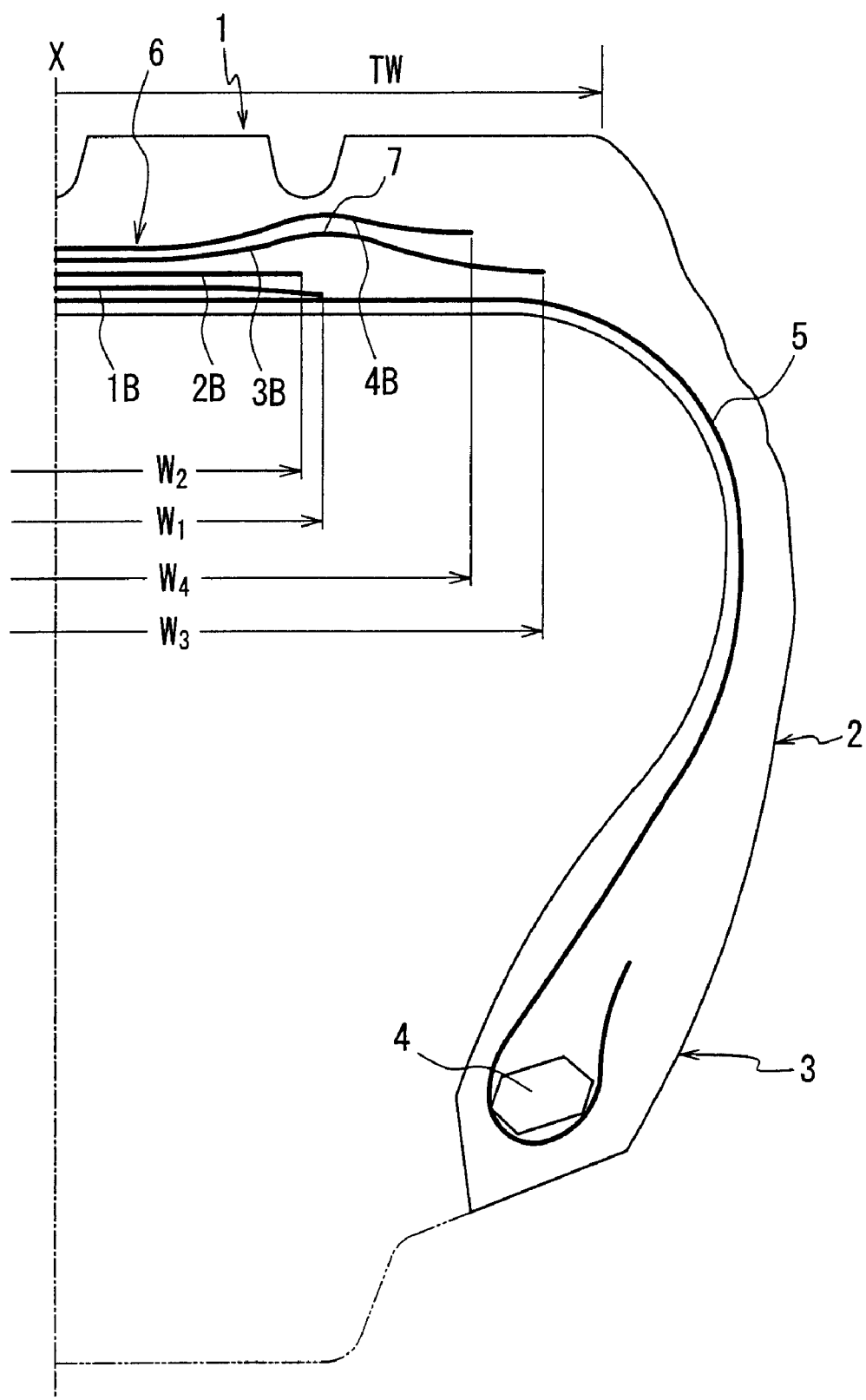
FIG. 2 is a widthwise sectional view of a half body of the tire showing an embodiment of the present invention.

FIG. 2 is a widthwise sectional view of a half body of a tire showing an embodiment of the present invention under a tire posture in which the tire is assembled to an applied rim and filled with a specified internal pressure. In the figure, reference numeral 1 denotes a tread part, reference numeral 2 a sidewall part extending in the radial direction in continuous with the side part of the tread part 1, and reference numeral 3 a bead part which is continuous with the inner periphery side of the sidewall part 2.

In this configuration, a radial carcass 5 is arranged which is made up of at least one carcass play extending in a toroidal form between bead cores 4 disposed in each bead part 3 to reinforce each of the above described parts 1, 2, 3, and each side portion of the radial carcass 5 is rolled back in radially outward direction around the bead core 4.

Then, there are arranged at the outer periphery side of the crown area of the radial carcass 5 a belt layer having not less than three layers to reinforce the tread part 1, which is a belt 6 made up of four belt layers in the figure. Among these belt layers, the innermost belt layer and the second belt layer which is adjacent to the outer periphery side thereof are referred to as inside narrow-width belt layers 1B, 2B respectively. And the third belt layer and the outermost belt layer, which are arranged on the outer periphery side of the belt layers 1B, 2B, are referred to as outside wide-range belt layers 3B, 4B, respectively.

Figure 3:
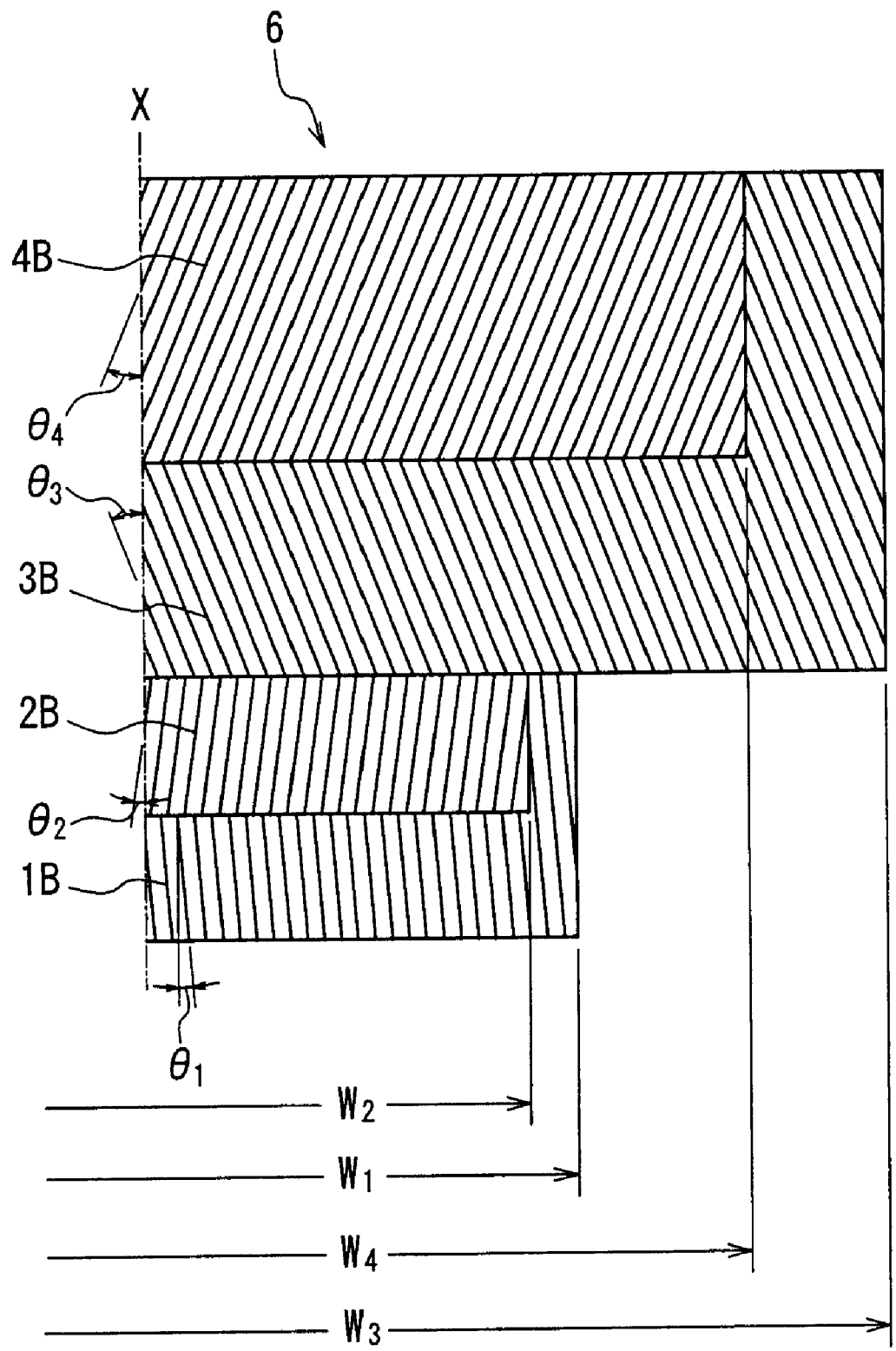
FIG. 3 is a plan perspective view of respective belt layers showing a half body of the belt.

Further, as shown in FIG. 3 in which a principal part of the belt is shown in a plan perspective view, respective belts are configured with each other such that: the width $W_1$ of the innermost narrow-width belt layer 1B measured in the tire width direction is larger than the like width $W_2$ of the narrow-width belt layer 2B at the second layer position; the wide-width belt layer 3B at the third layer position has a larger width than any other belt layers; and the width $W_4$ of the outermost wide-width belt layer 4B is larger than that of the innermost narrow-width belt layer 1B and smaller than the width $W_3$ of the belt layer 3B at the third layer position.

Here, a preferable configuration is such that the widths $W_1$, $W_2$ of both narrow-width belt layers 1B, 2B are in a range of 0.25 to 0.5 times of the tread width TW, and the widths $W_3$, $W_4$ of both wide-width belt layers 3B, 4B are in a range of 0.6 to 0.8 times of the tread width TW.

Further, it is also preferable to configure such that the difference between the average width of both wide-width belt layers 3B, 4B and the average width of both narrow-width belt layers 1B, 2B is within a range of 0.2 to 0.4 times of the tread width TW.

Further configuration is such that the intersection angles $\theta_1$, $\theta_2$ of the beltcords, which are made of steel, alamido fiber, or other non-extensible materials, with respect to the tire equatorial plane X, of respective narrow-width belt layers 1B, 2B are both preferably in a range of 3 to 10°, and the intersection angles $\theta_3$, $\theta_4$ of the equivalent beltcords of the wide-width belt layers 3B, 4B with respect to the tire equatorial plane X are both larger than the above described intersection angles $\theta_1$, $\theta_2$, and are preferably in a range of 15 to 35°.

It is also preferable to configure that respective beltcords extend in opposite directions with respect to the tire equatorial plane between adjacent belt layers as shown in FIG. 3.

Figure 4:
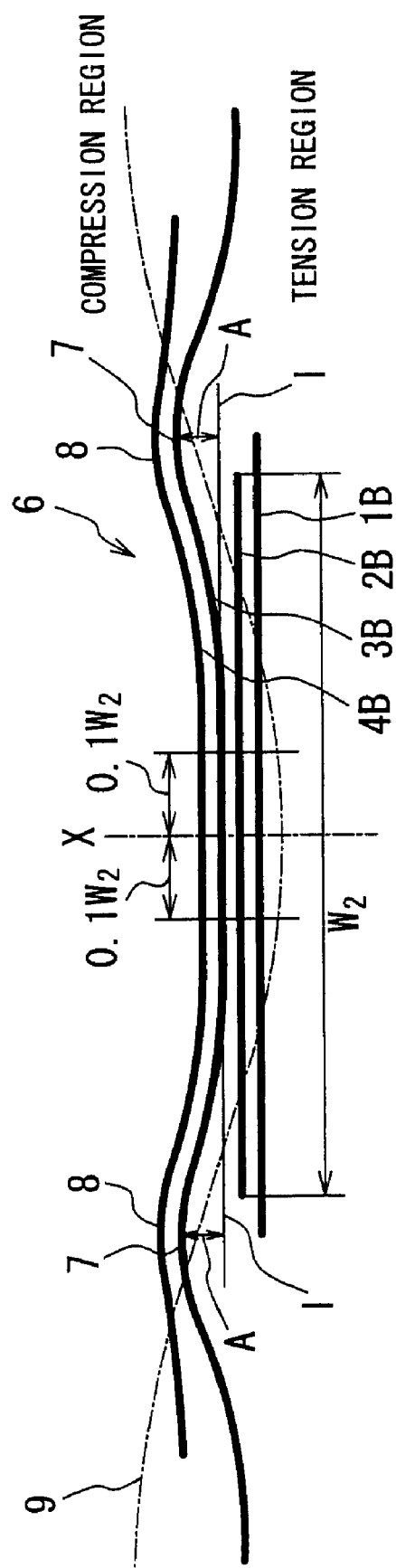
FIG. 4 is a widthwise sectional view to show an example of a convex part formed in a wide-width belt layer at the third layer position.

In the above described arrangement of respective belt layers, it is further configured as shown by enlarging the belt 6 in FIG. 4 such that: a portion of the wide-width belt layer 3B at the third layer position, corresponding to a side-edge vicinity portion of the second narrow-width belt layer 2B, in other words, a portion corresponding to the range of 80 to 140% with respect to the width $W_2$ of the narrow-width belt layer 2B centered around the tire equatorial plane X, is formed into, for example, a shape which is convex in radially outward direction in all or part of the range by insertion of rubber material or other methods. In the convex part 7 thus configured, its maximum projection height (A) of the inner peripheral surface, which is measured in the tire radial direction from the straight line which is tangent to the inner peripheral surface of the wide-width belt layer 3B at a position a distance of 0.1 times of the width $W_2$ of the outer narrow-width belt layer 2B away from the tire equatorial plane X, and extends parallel with the central axis line of the tire, is adapted to be within the following range:

$$0.5 \times d_3 < A < 2 \times d_3$$

where $d_3$ is a diameter of beltcord of the wide-width belt layer 3B.

The diameter of beltcord $d_3$ may be in the range of 1.0 to 7.0 mm in most cases.

According to the configuration of the belt 6 described above, when the belt 6 undergoes a bending deformation as the result of that the tread ground-contact portion is deformed by being indented in radially inward direction by the rolling of tire under load, the neutral axis of bending will extend as shown by a chain line in FIG. 4 such that the side edge portions of the narrow-width belt layers 1B, 2B are both situated in a tension region, while the wide-width belt layers, particularly the wide-width belt layer 3B at the third layer position, which is adjacent to the peripheral side of the narrow-width belt layer 2B at the second layer position, will be situated in a compression region over a wider range including a portion corresponding to the side edge portion of the narrow-width belt layer 2B at the second layer position due to the formation of the convex part 7. Thus, as described earlier, it becomes possible to sufficiently increase the difference in expansion and contraction between the narrow-width belt layer 2B at the second layer position and the wide-width belt layer 3B at the third layer position, and as a consequence, shear strain between those layers caused by bending deformation can be effectively reduced as shown in FIG. 1.

Figure 1:
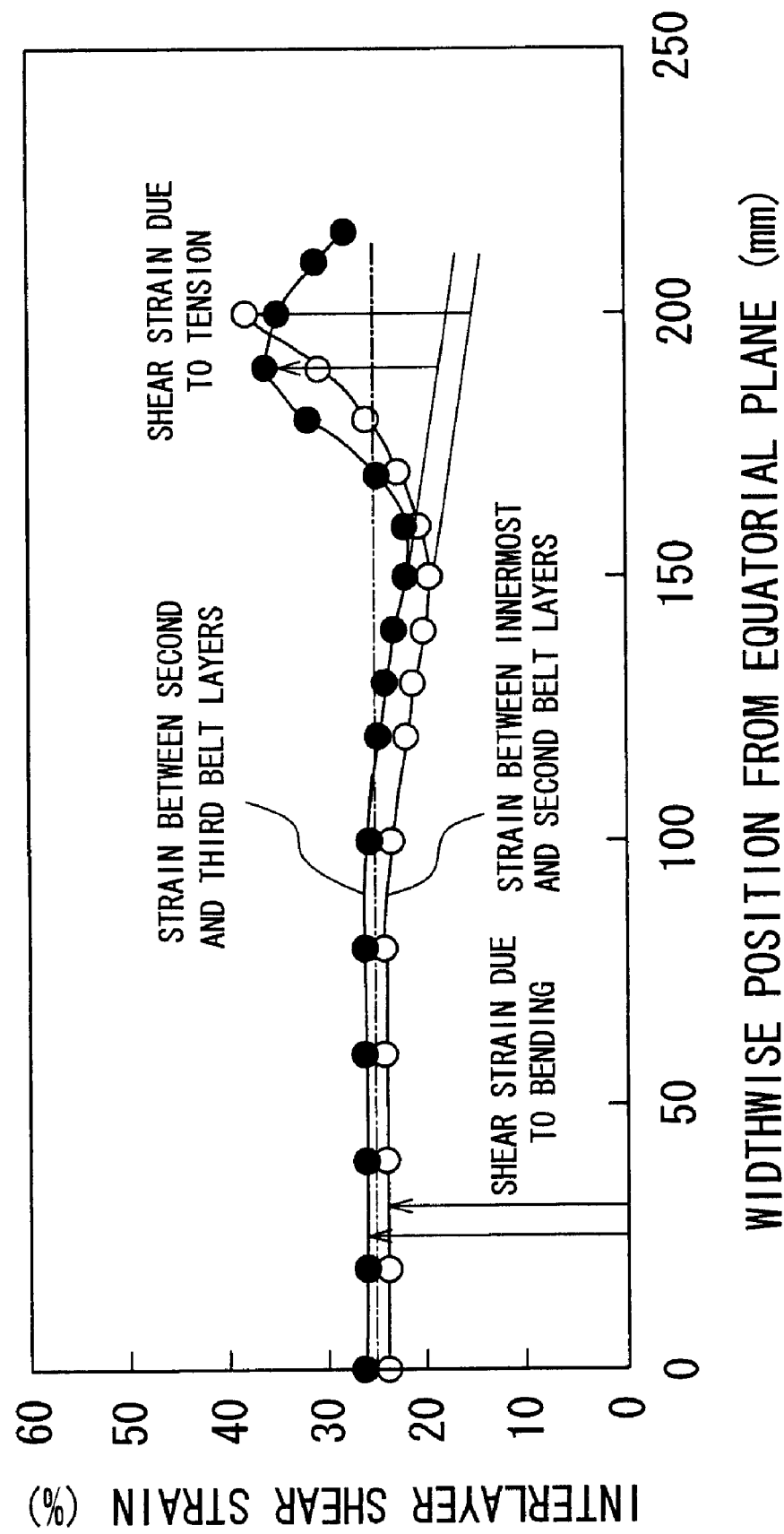
FIG. 1 is a graph to show the effects offered by the tire relating to the present invention.

Further, according to what is shown in FIG. 1, it is understood that from the above described reason, shear strain between the innermost narrow-width belt layer 1B and the narrow-width belt layer 2B at the second layer position can also be effectively reduced.

On the other hand, the convex part 7 of the wide-width belt layer 3B at the third layer position, as clearly seen from FIG. 1, functions to reduce the interlayer shear strain generated between the side edge portion of the narrow-width belt layer 2B at the second layer position and the wide-width belt layer 3B caused by a circumferential tension.

Figure 5:
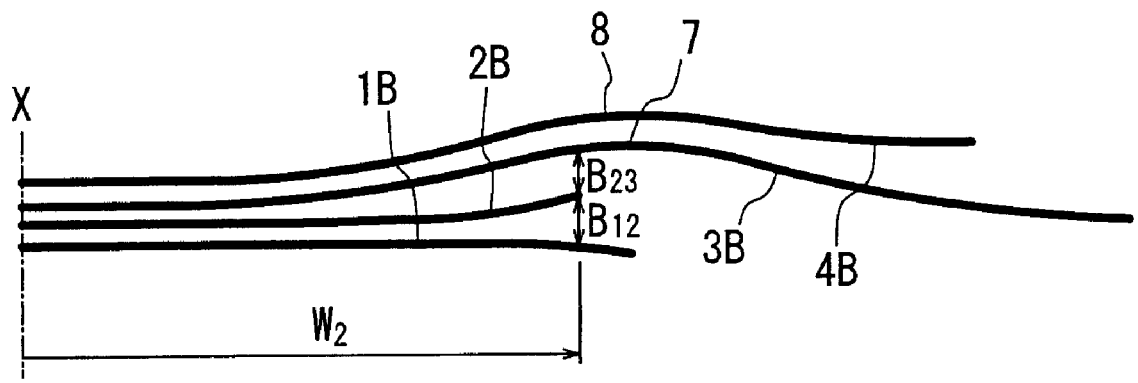
FIG. 5 shows an example in which the interlayer rubber thickness between the innermost belt layer and the second belt layer is increased.

Moreover, the reduction of the interlayer shear strain generated between the innermost narrow-width belt layer 1B and the side edge portion of the narrow-width belt layer 2B at the second layer position, caused by a circumferential tension can be realized by, as shown in FIG. 5, making the thickness $B_{12}$ including coating rubber at a side edge portion of the narrow-width belt layer 2B at the second layer position from the beltcord thereof to the beltcord of the innermost narrow-width belt layer 1B to be about 1 to 7 mm larger than the rubber thickness of other portions between the both belt layers.

Figure 6:
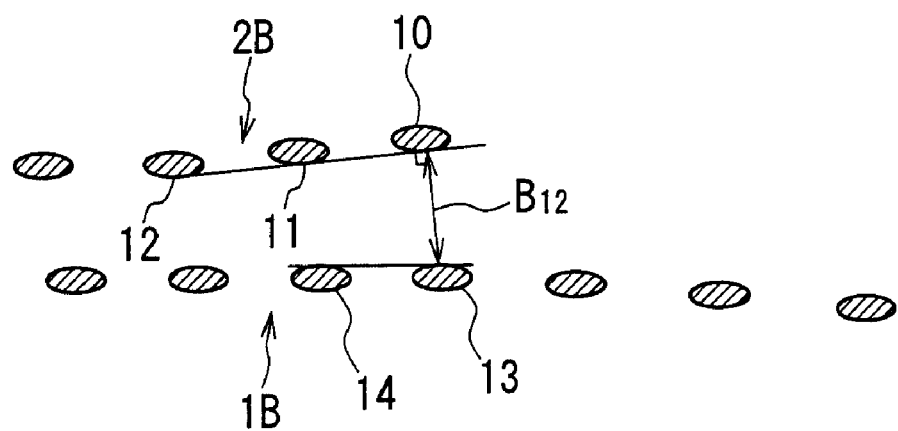
FIG. 6 is an enlarged view to show a measurement mode of the interlayer rubber thickness between the second belt layer and the innermost belt layer.

In this case, the measurement of the interlayer rubber thickness $B_{12}$ can be performed, as illustrated by enlarging beltcords in FIG. 6, by measuring the distance from the cord 10 situated closest to the side edge of the narrow-width belt layer 2B at the second layer position in the direction perpendicular to a straight line tangent to the inner peripheral edge thereof and the inner peripheral edges of respective second and third cords 11, 12, to a straight line extending tangent to the outer periphery edges of two cords 13, 14 situated closest to the aforementioned cord 10, which is the beltcord of the innermost narrow-width belt layer 1B. This is similarly applicable to the measurement of the rubber thickness $B_{23}$ of respective beltcords of the belt layer 2B at the second layer position and the belt layer 3B at the third layer position.

When the interlayer rubber thickness $B_{12}$ as described above is larger only by less than 1 mm than the rubber thicknesses of other portions between belt layer 1B and the belt layer 2B, the effectiveness of intentionally increasing the thickness is insufficient, and on the other hand, when the difference exceeds 7 mm, there is risk of generating too much heat.

Here, the rubber thicknesses of other portions are typically given as the sum of the thicknesses of respective coating rubber for the beltcords of respective belt layers 1B, 2B.

Further, it is preferable that such interlayer rubber thickness $B_{12}$, with respect to the rubber thickness $B_{23}$ as shown in FIG. 5, which is measured in a similar way as that described above, at the side edge position of the narrow-width belt layer 2B at the second layer position to the beltcord of the wide-width belt layer 3B of the third layer position, satisfies the following relationship:

$$0.7 \times B_{23} < B_{12} < 1.8 \times B_{23}$$

in order to balance the strain for the belt layer 2B between itself and the belt layer 1B, and between itself and the belt layer 3B.

Embodiment 1

Figure 7:
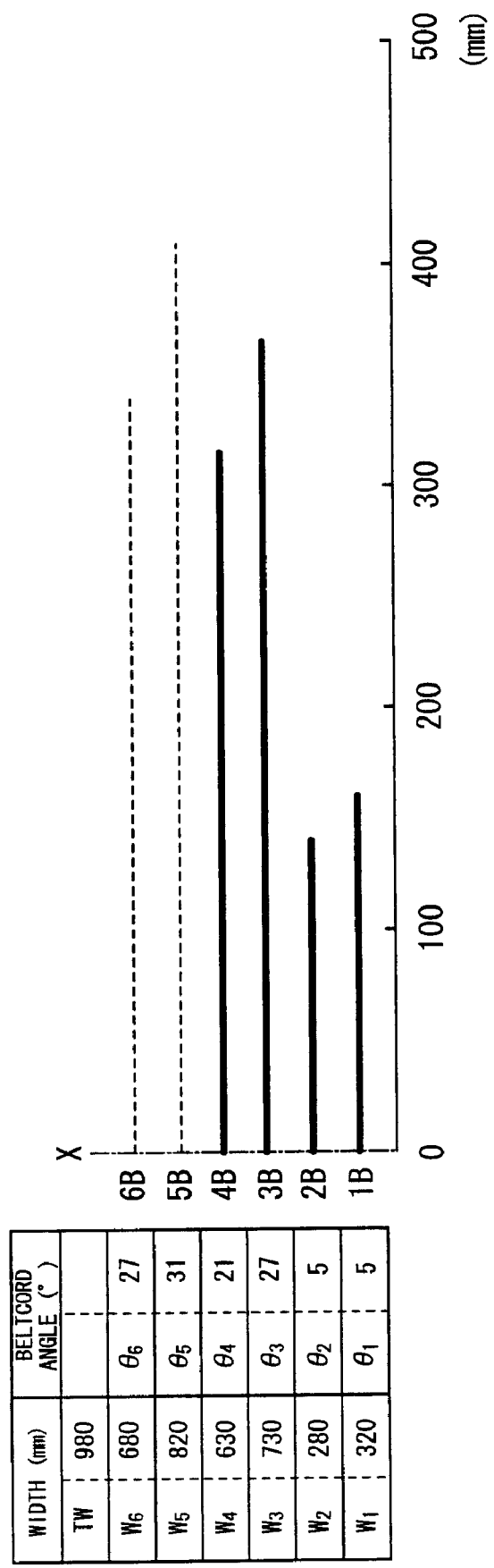
FIG. 7 shows a basic lamination structure etc. of belt layers of the tire used for an embodiment.
Figure 9:
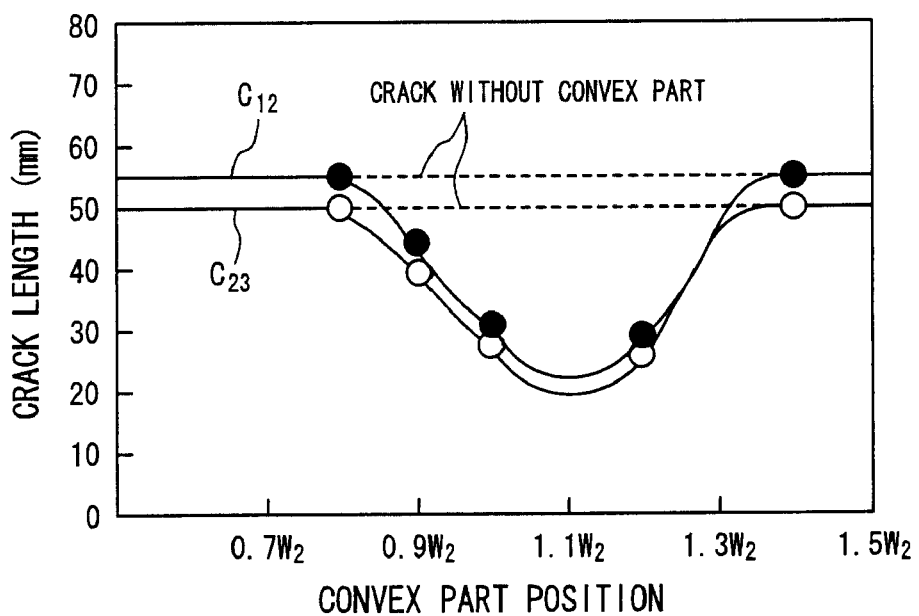
FIG. 9 shows the result of crack growth length of Embodiment 1.

For a tire having a size of 4000R57, a belt structure of 6 layers and a tread width as shown in FIG. 7, the durability and heat generation property of the belt have been evaluated for the cases in which the formation position of the convex part of the wide-width belt layer 3B at the third layer position is varied as shown in FIG. 8, eventually obtaining results, which are shown by a table and a graph in FIG. 9.

All the evaluations have been performed by assembling the tire to a rim having a rim width of 29 inches, filling it with an internal pressure of 700 kPa, and rolling it under load at a velocity of 10 km/h on a test drum of 5.0 m diameter under the ambient temperature of 30° C.

The evaluation of the belt durability is performed by setting the load mass to be 150% of the mass specified by the TRA standard and the lateral input to the tread surface to be 0.1 G, rolling the tire for 240 hours, and thereafter measuring the growth length of cracks generated from side edges of the belt layer by laterally cutting the tire at four points on the perimeter.

Figure 13:
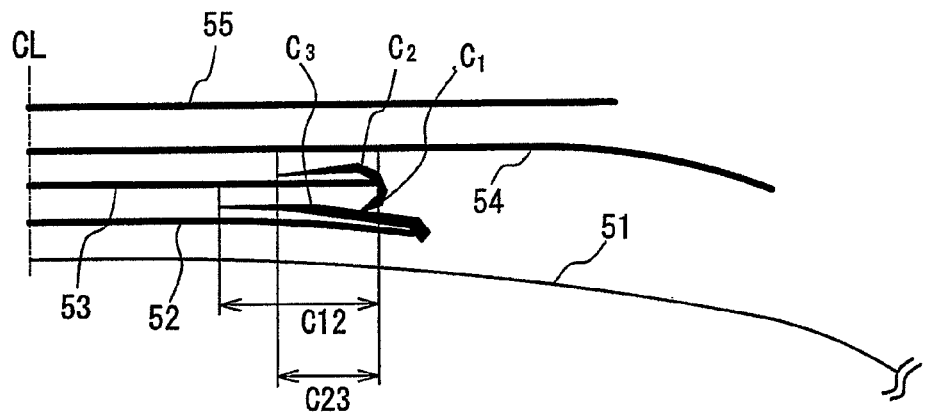
FIG. 13 is a widthwise sectional view of a half body of a conventional tire showing its belt structure.
Figure 14:
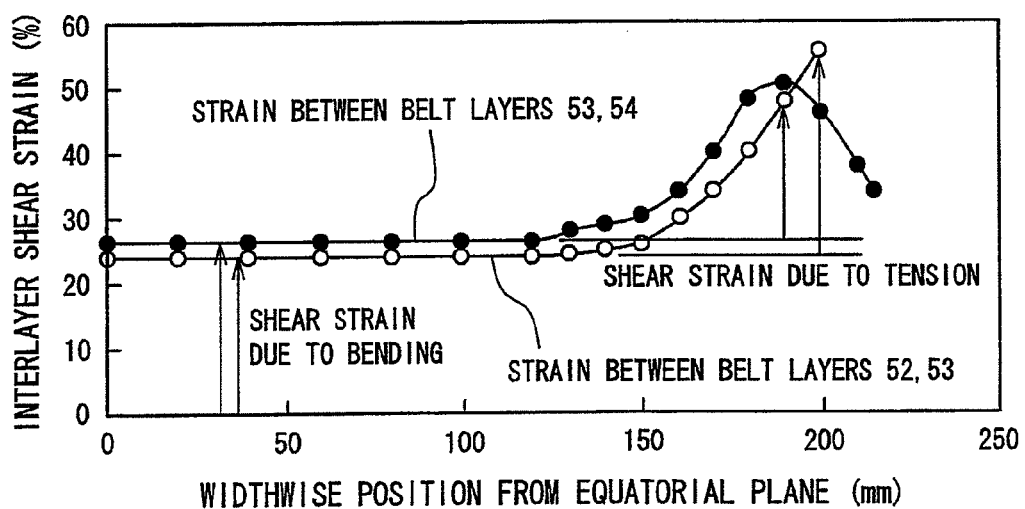
FIG. 14 is a graph to show the proportion of interlayer shear strain generated in a conventional belt structure.

Moreover, in this test, since cracks $C_1$, $C_2$, $C_3$ as described relating to FIG. 13 have been generated at side edges of the two inside narrow-width belt layers both in a conventional tire in which a convex part is not formed at the wide-width belt layer 3B at the third layer position and in embodiment tires 1 to 5, a maximum length C12 of the crack between the narrow-width belt layers and the length of the crack C23 between the belt layer at the second layer position and the belt layer at the third layer position have been measured with the reference to the side edge position of the narrow-width belt layer of the second layer position.

According to what is shown in FIG. 9, although it is possible to particularly effectively restrain the growth of a crack when the formation position of a convex part, in particular its peak is positioned in a range of $1.0 W_2$ to $1.2 W_2$, this restraint effect can be secured all over the range of $0.8 W_2$ to $1.4 W_2$.

The heat generation property of each tire described above was evaluated by setting the load mass of tire to be 10% of the TRA standard, after rolling for 48 hours at a velocity of 10 km/h under a straight running condition measuring the temperature on the outermost belt layer through small diameter holes formed with even space at nine positions on the tread surface in the width direction thereof and the average temperature was evaluated by a 10 points scale. All embodiment tires showed a constant value, A=5.0 mm ($d_3$=5.0 mm), since the rubber thickness of the tread becomes constant, the value was a constant value of about 0.5.

In this respect, the lower the evaluation value becomes the less heat the tire generates, thus meaning a more preferable tire.

Embodiment 2

Figure 11:
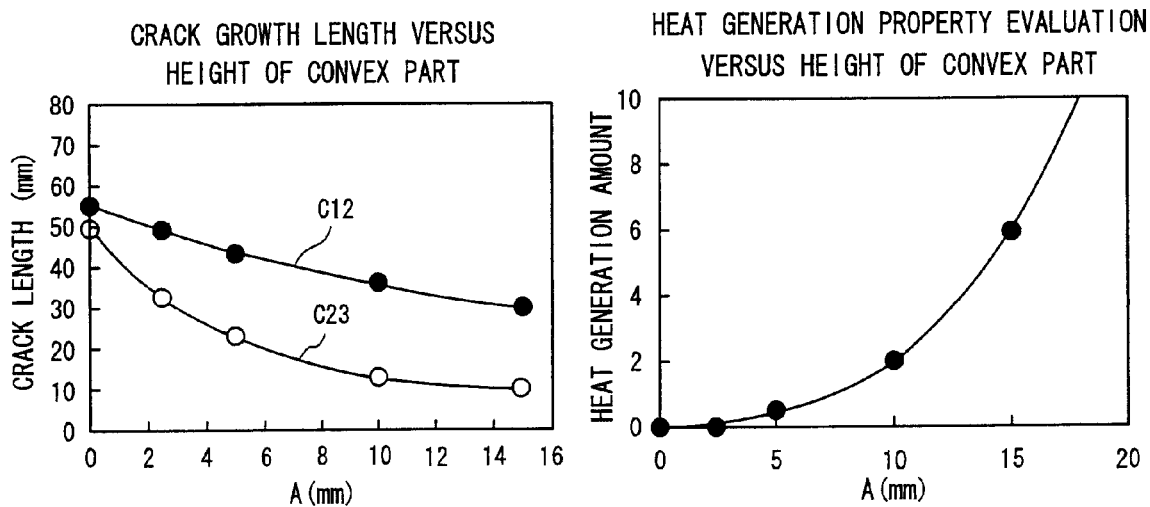
FIG. 11 shows the result of Embodiment 2.

For tires having the same basic structure as the tire used in Embodiment 1, the belt durability and heat generation property were evaluated in the same way as described above by setting the formation position of a convex part of the wide-width belt layer at the third layer position to be a position of 1.0 times of width $W_2$ of the narrow-width belt layer of the second layer position, while varying the maximum projection height A as shown in FIG. 10 while keeping the diameter $d_3$ of the beltcord at a constant 5.0 mm, eventually obtaining results, which are shown in a table and a graph in FIG. 11.

From FIG. 11, it is revealed that the higher the maximum projection height A of the convex part becomes, the shorter the growth length C12, C23 of crack becomes, and on the other hand, the heat generation amount rapidly increases when the maximum projection height A exceeds 10 mm.

Embodiment 3

Figure 12:
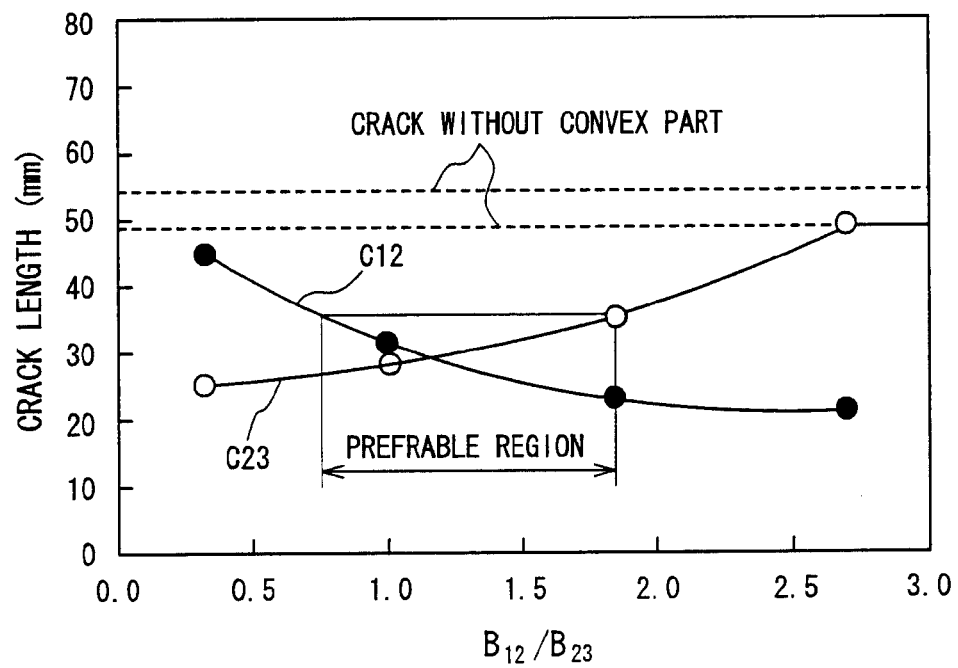
FIG. 12 shows the result of Embodiment 3.

For the tire having the same basic structure as the tire used in Embodiment 1, the belt durability was evaluated in the same manner as with Embodiment 1 when the ratio of the interlayer rubber thickness B12, which was measured at side edge position of the narrow-width belt layer at the second layer position to the interlayer rubber thickness $B_{23}$ is varied, eventually obtaining results, which are shown in a table and a graph in FIG. 12.

From FIG. 12, particularly to the graph, it is revealed that when the ratio of interlayer rubber thickness ($B_{12}/B_{23}$) is in a range of 0.7 to 1.8, the growth lengths of crack C12, C23 between the second and innermost belt layers, and between the belt layer at the second layer position and the belt layer at the third layer position can be restrained to be sufficiently short, while when it is out of the above described range, either one of the growth lengths of crack would increase rapidly compared to the other one.

What is claimed is:

1. A heavy duty pneumatic tire in which two inside narrow-width belt layers and one or more outside wide-width belt layers, which have a larger width than the narrow-width belt layers, are sequentially disposed in the outer periphery side of a crown area of a radial carcass, wherein a width of the inner narrow-width belt layer is adapted to have a larger width than that of the outer narrow-width belt layer, each of the narrow-width belt layers and the one or more wide-width belt layers comprise a plurality of beltcords, and the beltcords of the two narrow-width belt layers are adapted to have a smaller intersection angle with respect to a tire equatorial plane than that of the beltcords of the one or more wide-width belt layers, wherein the beltcords of the narrow-width belt layers are adapted to extend in a direction so as to intersect with each other between the layers, and a portion of the one or more wide-width belt layers, which is situated adjacent to the outer periphery side of the two narrow-width belt layers, corresponding to a side-edge vicinity of the outer narrow-width belt layer, is formed to be convex in a radially outward direction toward an outer surface of the pneumatic tire with respect to a line extending parallel with a central axis line of the tire and in contact with an inner peripheral surface of the wide-width belt layer at a position at a distance in the tire width direction of 0.1 times the width of the outer narrow-width belt layer from the equatorial plane, and wherein the rubber thickness $B_{12}$ from the beltcord at the side edge position of the outer narrow-width belt layer to the beltcord of the inner narrow-width belt layer is larger than the rubber thickness of the other portions between the two layers, and the rubber thickness $B_{12}$ is within the following range, with respect to a rubber thickness $B_{23}$ from the beltcord at the side edge position of the outer narrow-width belt layer to the beltcord of the wide-width belt layer situated at an outer peripheral side of the outer narrow-width belt layer:

$$0.7 \times B_{23} < B_{12} < 1.8 \times B_{23}.$$

2. The heavy duty pneumatic tire according to claim 1, wherein a maximum projection height A of an inner peripheral surface of the convex part in a radial direction, with reference to the inner peripheral surface of each respective one of the one or more wide-width belt layers at a position at a distance of 0.1 times of the width (W2) of the outer narrow-width belt layer from the tire equatorial plane, is within the following range:

$$0.5 \times d_3 < A < 2 \times d_3$$

where $d_3$ is a diameter of the beltcords of each respective one of the one or more wide-width belt layers.

3. The heavy duty pneumatic tire according to claim 1, wherein the widths of the narrow-width belt layers are within a range of 0.25 to 0.5 times of a tread width (TW), and the intersection angle of the beltcords of the narrow-width belt layers with respect to the tire equatorial plane is within a range of 3 to 10°.

4. The heavy duty pneumatic tire according to claim 1, wherein the tire comprises a tread having a tread width (TW) and wherein the width of the one or more wide-width belt layers is within a range of 0.6 to 0.8 times of the tread width (TW), and the intersection angle of the beltcords of the one or more wide-width belt layers with respect to the tire equatorial plane is within a range of 15 to 35°.

5. The heavy duty pneumatic tire according to claim 1, wherein a difference between the average width of the one or more wide-width belt layers and that of the narrow-width belt layers is within a range of 0.2 to 0.4 times of a tread width (TW).

* * * * *